No. 624,492. Patented May 9, 1899.
E. G. HOFFMANN.
DRIVE CHAIN.
(Application filed Mar. 5, 1898.)
(No Model.)
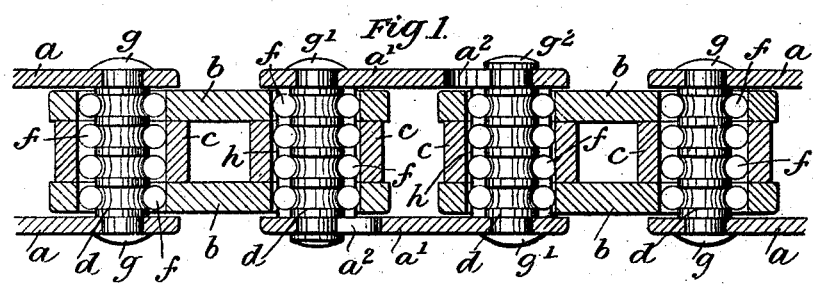
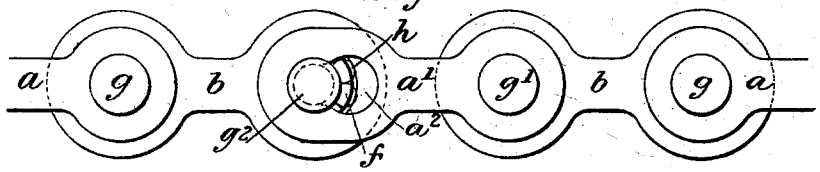
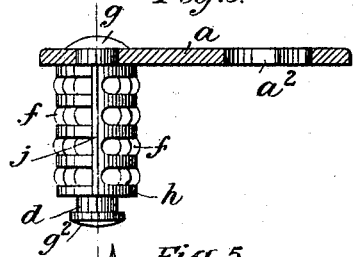
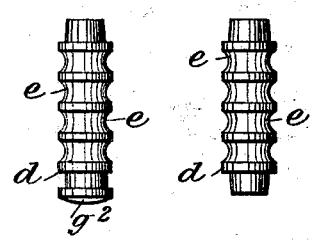
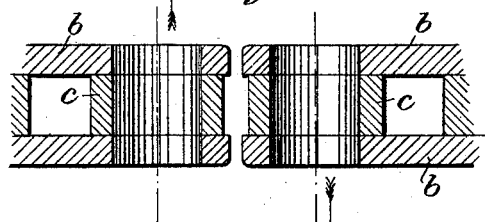
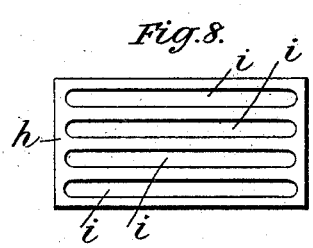
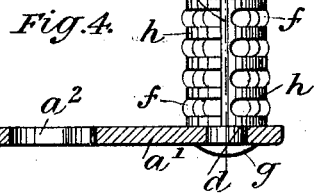
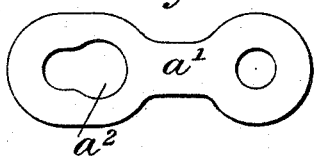
WITNESSES
F. M. Eggleston.
A. N. Jesbera
INVENTOR.
Ernst Gustav Hoffmann
by Redding, Kiddle & Greeley
Attys

UNITED STATES PATENT OFFICE.

ERNST GUSTAV HOFFMANN, OF LONDON, ENGLAND.

DRIVE-CHAIN.

SPECIFICATION forming part of Letters Patent No. 624,492, dated May 9, 1899.

Application filed March 5, 1898. Serial No. 672,755. (No model.)

*To all whom it may concern:*

Be it known that I, ERNST GUSTAV HOFFMANN, a subject of the German Emperor, residing at London, England, have invented a certain new and useful Improvement in Drive-Chains, of which the following is a specification.

This invention relates to an improvement in drive-chains adapted for chain-driven cycles, as well as for driving various machinery and apparatus, the object of the invention being to produce an easy-running chain and one in which the stretch under wear is reduced to an exceedingly small amount by reason of the arrangement of the pins or rivets and balls forming same.

In the accompanying drawings the invention is illustrated as applied to what is known as a "roller-chain," and from this its application to a block-chain will be easily understood.

Figure 1 is a sectional plan of several links of a chain. Fig. 2 is a side elevation. Fig. 3 is a detail to show one side of the chain-opening connecting-link, its pin or rivet, and an arrangement for holding the balls during withdrawal of the rivet. Fig. 4 is a similar view showing the opposite connecting-link and its corresponding arrangement of parts. Fig. 5 is a sectional plan showing two ends of the working links with which the above connecting-links engage. Fig. 6 is an elevation of a pin or rivet of the chain-opening link. Fig. 7 is an elevation of a pin or rivet of the ordinary links. Fig. 8 is a plan of a piece of metal employed in holding the balls in the chain-opening link, and Fig. 9 is a side elevation of one of the chain-opening connecting-links.

The chain illustrated is made up of plates $a$, forming the connecting-links, and plates $b$, forming the working links, the latter having between them at each end a roller $c$, though a block forming a part of the links $b$ may be used in place of the roller, as is well understood.

In Fig. 1 is shown a portion of a chain in which occurs the link provided for the opening of same, and such link is provided out of one of the connecting-links and is formed of the plates $a'$, as shown. The plates $a$ (and of course the plates $a'$) on each side are united by pins or rivets $d$, which pass through openings in the plates $b$ and through the rollers $c$. The pins or rivets are provided with a number of grooves $e$, (shown in Figs. 6 and 7,) such grooves having a rounded surface formed of the same curvature as that of balls $f$, forming a series of races for such balls, which by reason of the curve of such grooves are provided with a large wearing-surface on the pin. Suitable plane surfaces are left between each groove $e$ to separate each series of balls. The plates $b$ of the working links and the rollers $c$ both bear on these balls in the interior of the openings of same, such openings being plain curved surfaces without any races, so that the balls have a bearing only on a small point of such surfaces.

Each end of the pins or rivets of the ordinary links is reduced in diameter, as shown in Fig. 7, and when in position in the chain with the balls in place is riveted over, as shown at $g$ at either end of Fig. 1. In the case, however, of the links that require to be opened the pins or rivets are formed, as shown in Fig. 6, with one reduced end, which may be riveted on the plate $a'$, as shown in Fig. 1, and a head $g^2$, adapted to pass into a keyhole-shaped opening $a^2$, Figs. 1, 2, 3, 4, and 9, of the plate $a'$, which will be held by same when the narrow end of such opening is brought under the head $g^2$, as it would be when the chain is in tension. The arrangement preferred is to arrange the plates $a'$ so that one of the slots $a^2$ comes at the opposite end to the one on the other side, as shown in the drawings, whereby each pin or rivet $d$ is firmly held by one of the plates.

To open the chain, the two working links connected by such plates $a'$ are forced toward each other, so as to press the headed ends $g^2$ of the pins or rivets into the larger end of the keyhole-slots $a^2$, which will enable one or both of the plates $a'$ and its attached pin or rivet to be withdrawn. In the ordinary course the withdrawal of the pin or rivet $d$ will cause it to bring with it the balls $f$, and as this would necessitate their being replaced separately when putting together the chain an arrangement is employed for holding the balls in their races during the withdrawal of the pin and so that they remain on such pin, as shown in Figs. 3 and 4, Fig. 5 showing the ends of two working links from which such pins have just been withdrawn. The device employed for this purpose consists of a piece of thin sheet metal $h$, Fig. 8, provided with a number of long slots $i$, one slot being for each of the series of balls. This is bent around the balls and pin, so that the balls project for a part of their diameter through the slots $i$ before the pin is placed in position in the chain, and thus holding the balls to the pins whenever it is desired to remove the latter. The ends of the plate may overlap, as shown in Figs. 3 and 4, at $j$, such ends serving to strengthen the plate. They are of such a width that they will lie in the ordinary space left between any two of the balls. The retaining device is shown in position in the chain in Figs. 1 and 2.

What I claim is—

1. In a roller-chain and in combination a pin, grooves in same, balls carried in said grooves, and a bushing forming the roller of the chain surrounding said balls and pin, substantially as described.

2. In a drive-chain and in combination, a pin, a series of grooves in same, plates forming links in the chain through openings in which the pin passes, a bushing forming a roller between said plates and surrounding the pin, and balls located in the grooves of the pin and forming an antifriction-bearing for both the plates and roller, substantially as described.

3. In a drive-chain the combination with a grooved pin of a series of balls in said grooves and a plate having a series of slots in same, one for each series of balls, said plate being bent around the pin and balls, so that the latter project through the slots but are held by the plate in their grooves on the pin substantially as described.

In testimony whereof I have hereunto set my hand in the presence of two subscribing witnesses.

ERNST GUSTAV HOFFMANN.

Witnesses:
ALLEN PARRY JONES,
FRED C. HARRIS.